(12) United States Patent
Stievater et al.

(10) Patent No.: US 12,553,792 B2
(45) Date of Patent: Feb. 17, 2026

(54) METHODS AND APPARATUSES FOR OPTICAL AND GEOMETRIC PARAMETER EXTRACTION FOR PHOTONIC INTEGRATED CIRCUITS

(71) Applicant: The Government of the United States, as represented by the Secretary of the Navy, Washington, DC (US)

(72) Inventors: Todd H. Stievater, Arlington, VA (US); Nathan Tyndall, Alexandria, VA (US); Marcel W. Pruessner, Chevy Chase, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 130 days.

(21) Appl. No.: 18/081,424

(22) Filed: Dec. 14, 2022

(65) Prior Publication Data

US 2023/0184623 A1  Jun. 15, 2023

Related U.S. Application Data

(60) Provisional application No. 63/289,487, filed on Dec. 14, 2021.

(51) Int. Cl.
*G01M 11/00* (2006.01)
(52) U.S. Cl.
CPC ........ *G01M 11/331* (2013.01); *G01M 11/333* (2013.01); *G01M 11/335* (2013.01)
(58) Field of Classification Search
CPC . G01M 11/331; G01M 11/333; G01M 11/335
See application file for complete search history.

(56) References Cited

U.S. PATENT DOCUMENTS

| | | | |
|---|---|---|---|
| 2018/0274900 A1* | 9/2018 | Mower | G01B 9/02049 |
| 2019/0072833 A1* | 3/2019 | Nejadriahi | G02F 1/225 |
| 2021/0131873 A1* | 5/2021 | Zeiler | G01J 3/45 |

OTHER PUBLICATIONS

Todd H. Stievater, Nathan F. Tyndall, Marcel W. Pruessner, Dmitry A. Kozak, and William S. Rabinovich, "Optical and geometric parameter extraction for photonic integrated circuits," Opt. Express 30, 14453-14460 (2022) (Year: 2022).*

(Continued)

*Primary Examiner* — Dominic J Bologna
(74) *Attorney, Agent, or Firm* — US Naval Research Laboratory

(57) ABSTRACT

A method and system for obtaining photonic parameters. The system includes a computer, an optical source, a first and second optical fiber, a Mach-Zehnder Interferometer (MZI) structure, and a detector. The computer includes a processor and memory. The optical source is constructed to emit light of a first optical mode and a second optical mode in response to an instruction by the computer. The first optical fiber receives the first or second optical mode. The MZI structure includes first and second pluralities MZIs and receives the first or second optical mode from the optical fiber. The second optical fiber receives light from the MZI structure. The detector is configured to receive light that propagated through the second optical fiber, generate image data and provide the image data to the computer. The computer obtains a plurality of photonic parameters based on the image data and initial guesses for the plurality of photonic parameters.

7 Claims, 9 Drawing Sheets

(56) References Cited

OTHER PUBLICATIONS

S. Dwivedi et al., "Experimental Extraction of Effective Refractive Index and Thermo-Optic Coefficients of Silicon-on-Insulator Waveguides Using Interferometers," in Journal of Lightwave Technology, vol. 33, No. 21, pp. 4471-4477, 1 Nov. 1, 2015, doi: 10.1109/JLT. 2015.2476603. (Year: 2015).*

D. Brooks and S. Ruschin. Improved near-field method for refractive index measurement of optical waveguides. IEEE Photonics Technology Letters, 8(2): 254-256, Feb. 1996.

Xi Chen, Zheng Li, Moustafa Mohamed, Li Shang, and Alan R. Mickelson. Parameter extraction from fabricated silicon photonic devices. Appl. Opt., 53(7): 1396-1405, Mar. 2014.

Tie-Nan Ding and Elsa Garmire. Measuring refractive index and thickness of thin films: a new technique. 212 Appl. Opt., 22(20):3177-3181, Oct. 1983.

Sarvagya Dwivedi, Alfonso Ruocco, Michael Vanslembrouck, Thijs Spuesens, Peter Bienstman, Pieter Dumon, Thomas Van Vaerenbergh, and Wim Bogaerts. Experimental extraction of efective refractive index and thermo-optic coefficients of silicon-on-insulator waveguides using interferometers. Journal of Lightwave Technology, 33 (21):4471-4477, 2015.

N. M. Fahrenkopf, C. McDonough, G. L. Leake, Z. Su, E. Timurdogan, and D. D. Coolbaugh. The AIM Photonics Mpw: A highly accessible cutting edge technology for rapid prototyping of photonic integrated circuits. IEEE Journal of Selected Topics in Quantum Electronics, 25(5): 1-6, 2019.

S. T. Huntington, A. Roberts, K. A. Nugent, P. Mulvaney, and M. Bazylenko. Fibre and waveguide refractive index measurements with AFM resolution. Japanese Journal of Applied Physics, 37(S1):62, 1998.

J. Jagerska, N. Le Thomas, R. Houdre, J. Bolten, C. Moormann, T. Wahlbrink, J. Ctyroky, M. Waldow, and M. Forst. Dispersion properties of silicon nanophotonic waveguides investigated with Fourier optics. Opt. Lett., 32 18):2723-2725, Sep. 2007.

H. J. Lee, C. H. Henry, K. J. Orlowsky, R. F. Kazarinov, and T. Y. Kometani. Refractive-index dispersion of phosphosilicate glass, thermal oxide, and silicon nitride films on silicon. Appl. Opt., 27(19):4104-4109, Oct. 1988.

Zeqin Lu, Jaspreet Jhoja, Jackson Klein, Xu Wang, Amy Liu, Jonas Flueckiger, James Pond, and Lukas Chrostowski. Performance prediction for silicon photonics integrated circuits with layout-dependent correlated manufacturing variability. Opt. Express, 25(9):9712-9733, May 2017.

Kevin Luke, Yoshitomo Okawachi, Michael R. E. Lamont, Alexander L. Gaeta, and Michal Lipson, Broadband mid- infrared frequency comb generation in a Si3N4 microresonator. Opt. Lett., 40(21):4823-4826, Nov. 2015.

Marco Masi, Regis Orobtchouk, Guofang Fan, Jean-Marc Fedeli, and Lorenzo Pavesi. Towards a realistic modelling of ultra-compact racetrack resonators. J. Lightwave Technol., 28(22):3233-3242, Nov. 2010.

Wan-Shao Tsai, San-Yu Ting, and Pei-KuenWei. Refractive index profiling of an optical waveguide from the determination of the effective index with measured differential felds. Opt. Express, 20(24): 26766-26777, Nov. 2012.

N. F. Tyndall, T. H. Stievater, D. A. Kozak, M. W. Pruessner, and W. S. Rabinovich. Mode-crossing spectroscopy for photonic waveguide characterization. APL Photonics, 4(10): 106107, 2019.

Nathan F. Tyndall, Dmitry A. Kozak, Marcel W. Pruessner, Peter G. Goetz, William S. Rabinovich, Todd. H. Stievater, Michael R. Bryan, Ethan Luta, Benjamin L. Miller, Nicholas M. Fahrenkopf, and Alin Antohe. Low-loss nanoslot waveguides for sensing fabricated in a CMOS foundry. In Conference on Lasers and Electro-Optics, page STu1A.7. Optical Society of America, 2021.

Nathan F. Tyndall, Todd H. Stievater, Dmitry A. Kozak, Marcel W. Pruessner, William S. Rabinovich, Nicholas M. Fahrenkopf, Alin O. Antohe, and Kevin A. McComber. A low-loss SiN photonic integrated circuit foundry platform for waveguide-enhanced Raman spectroscopy. In Sailing He and Laurent Vivien, editors, Smart Photonic and Optoelectronic Integrated Circuits XXIII, vol. 11690, pp. 40-46. International Society for Optics and Photonics, SPIE, 2021.

Yufei Xing, Jiaxing Dong, Sarvagya Dwivedi, Umar Khan, and Wim Bogaerts. Accurate extraction of fabricated geometry using optical measurement. Photon. Res., 6(11): 1008-1020, Nov. 2018.

Yufei Xing, Mi Wang, Alfonso Ruocco, Joris Geessels, Umar Khan, and Wim Bogaerts. Compact silicon photonics circuit to extract multiple parameters for process control monitoring. OSA Continuum, 3(2):379-390, Feb. 2020.

* cited by examiner

METHODS AND APPARATUSES FOR OPTICAL AND GEOMETRIC PARAMETER EXTRACTION FOR PHOTONIC INTEGRATED CIRCUITS

CROSS-REFERENCE TO RELATED APPLICATIONS

This application claims priority to U.S. Patent Application No. 63/289,487 filed Dec. 14, 2021, the contents of which are incorporated by referenced herein in their entirety.

BACKGROUND

Field of the Invention

The present application relates generally to methods and apparatuses for optical and geometric parameter extraction for photonic integrated circuits.

Description of Related Art

The field of photonic integrated circuits (PICs) has rapidly expanded over the past four decades. While PICs are widely used in data and communications, they are also used in the fields of healthcare, automotive repair, and even agriculture. In its most basic form, a PIC is a circuit that detects, generates, transports, and/or processes light. Typically, information or data is imposed upon that light. PICs are fabricated using techniques that are similar to electronic integrated circuits, namely photolithography. At a basic level, a PIC comprises a waveguide material, also referred to as a core and usually a cladding material that either completely or partially surrounds the core. The core and the cladding material may be formed on a substrate material, such as a wafer. FIG. 1 is an exemplary cross-section of a waveguide core 106 completely surrounded in a cladding material 104. The core 106 and the cladding are disposed on a substrate 102. Photolithography is a common for forming PICs. In photolithography a mask is used to pattern a material layer, and then depending on what type of photoresist was used a portion of the material layer is then removed. So, referring to FIG. 1, a layer of core material may be deposited on top of a cladding material, patterned, and then partially removed to form the core 106 shown in FIG. 1. Then, additional cladding material may be deposited to envelop core 106. The thickness t and the width w of the core itself, along with other geometric values, are determined by the PIC designer. While modern deposition and photolithography techniques can produce accurate results, deviations from a planned design of just a few nanometers can drastically impact performance.

In addition, more platforms are expanding to offer waveguide cores made from deposited materials such as silicon nitride (SiN), alumina ($Al_2O_3$), or titanium oxide ($TiO_2$) that can operate at wavelengths from the visible (380 nm-750 nm) to the L-band (1565 nm-1625 nm). The refractive index and dispersion of these materials, which depend on the wavelength and specific deposition process, are critical input parameters for all photonic components built on that platform. The exact refractive index can also vary for the cladding material. In other words, it is important for the PIC designer to have accurate values for width, thickness, core refractive index, and cladding refractive index, and to be able to regularly monitor the production of PICs in a manufacturing environment to ensure these values are within tolerances. Different techniques exist to measure the geometric properties of single-mode waveguides, such as scanning-electron microscope and atomic-force microscope, but these methods require the removal of the wafers, on which the PICS are formed, from the fabrication line and are often destructive. In addition, techniques to measure refractive indices and dispersion require specific structures to couple light into and out of the top of the wafers and are often incompatible with the multilayer architectures used in foundry processes today. Therefore, it would desirable to have method and apparatuses to determine width (or width offset), thickness, core refractive index, and cladding refractive index, that are non-destructive and do not require additional structures.

SUMMARY OF THE INVENTION

One or more the above limitations may be diminished by structures and methods described herein.

In one embodiment, a system for obtaining photonic parameters is provided. The system includes a computer, an optical source, a first and second optical fiber, a Mach-Zehnder Interferometer (MZI) structure, and a detector. The computer includes a processor and memory. The optical source is constructed to emit light of a first optical mode and a second optical mode in response to an instruction by the computer. The first optical fiber receives the first or second optical mode. The MZI structure includes first and second pluralities MZIs and receives the first or second optical mode from the optical fiber. The second optical fiber receives light from the MZI structure. The detector is configured to receive light that propagated through the second optical fiber, generate image data and provide the image data to the computer. The computer obtains a plurality of photonic parameters based on the image data and initial guesses for the plurality of photonic parameters.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Figure 1:
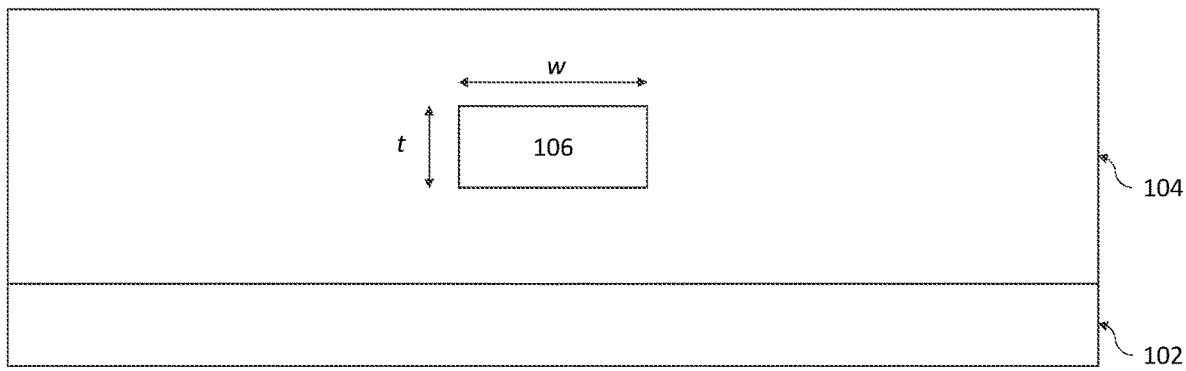
FIG. 1 is a cross-section view of a PIC that includes a core material embedded in a cladding material.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

Figure 2:
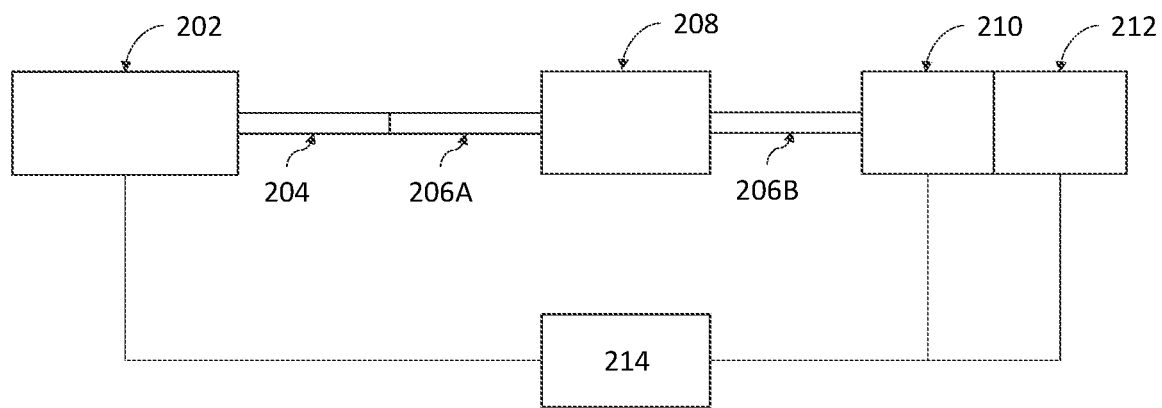
FIG. 2 is a schematic illustration of a system for obtaining photonic parameters according to one embodiment.
Figure 5:
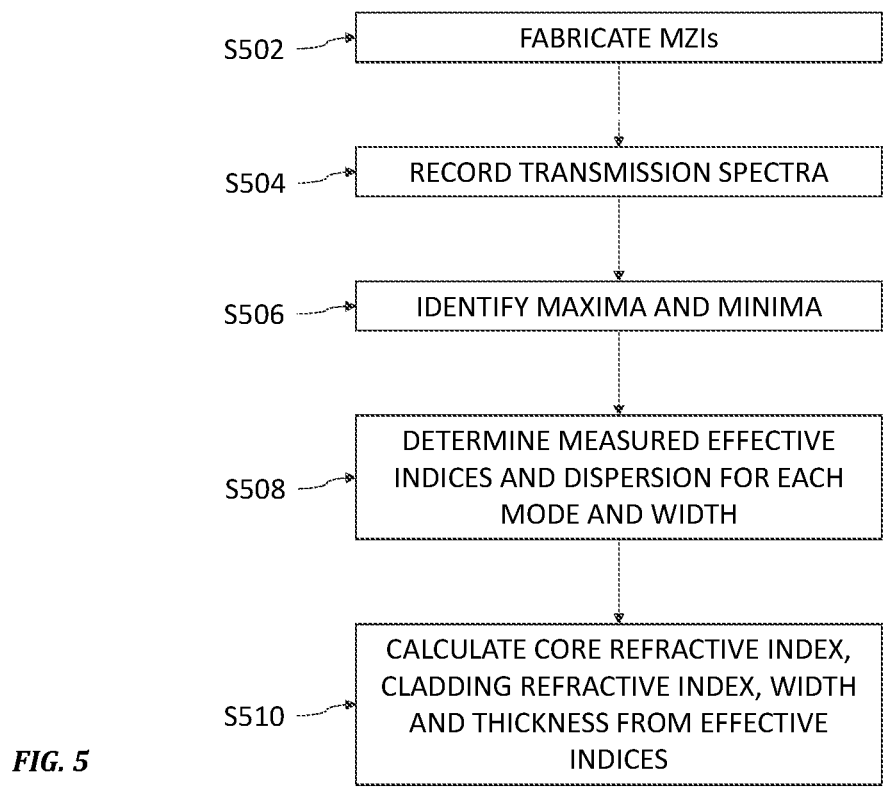
FIG. 5 is a flowchart illustrating a process of obtaining photonic parameters according to one embodiment.

In accordance with example aspects described herein are methods and apparatuses for extracting geometric parameters for PIC platforms. FIG. 2 is a schematic illustration of a system 200 for extracting certain photonic parameters, and FIG. 5 is a flowchart showing a process for doing the same. Described herein in detail is a technique to extract four photonic parameters using system 200, namely: a refractive index of the core material, a refractive index of the cladding material, thickness, and width offset from nominal. While great attention is given to describe the system and method for extracting these four parameters, the invention is not limited to extracting just those parameters. Any number of parameters may be extracted by modifying the system and process, as discussed below. However, for simplicity and ease of explanation primary importance is given to a system and method for extracting these four parameters. Before turning to the details, however, a brief explanation of the overall process is provided. As one of ordinary skill will appreciate, semiconductor foundries generally operate by forming multiple PICs or other photonic devices on a single semiconductor wafer in order to maximize efficiency and minimize waste. A client, that is a party who wants their photonic device crafted by the foundry, uses software along with a set of pre-designed and verified photonic components, called a process design kit (PDK), to design their photonic devices. The PDK is closely aligned to the capabilities of the foundry. Each PDK includes design guides (for assisting the client in design their photonic device), design rule checking decks, component libraries, and various plug-ins/scripts for clients to create their photonic devices. The client uses the PDK to design their photonic device and the device is then fabricated by the foundry on their wafer according to their development process. The client's device is usually formed alongside other devices on different parts of the wafer to again maximize efficiency and minimize waste. While the foundry operates their equipment within certain tolerances, it is not necessarily true that an error range (or stated differently a deviation from a nominal value) for a wafer in the production line is the same as the error range for another wafer in the production line. In fact, the error range may be different for two different areas on the same wafer.

In order to determine whether the foundry is manufacturing PICs within certain design tolerances, a plurality of Mach Zehnder Interferometers (MZIs) may be formed on the wafer alongside the other photonic devices. In the exemplary embodiment described below, extracting the four parameters requires the formation of two MZI structures of different widths, $w_1$ and $w_2$. In that embodiment, each MZI structure contains two sets of three MZIs. Each is set is used for the propagation of one optical mode, e.g., $TE_{00}$ or $TM_{00}$. Thus, if one is interested in obtaining the four parameters for one area of the wafer ($A_1$), then, in the exemplary embodiment, it is necessary to form to two MZI structures in that area. If one wishes to compare the parameters for area $A_1$ with another area on the wafer ($A_2$), then it is necessary to form two additional MZI structures in area $A_2$. Of course, if one wishes to compare the parameters for one area $A_1$ with yet another area ($A_3$) located on a different wafer in the production line, then it is necessary to form two additional MZI structures in area $A_3$. The choice of whether to form MZI structures at multiple locations on one wafer or on multiple wafers is one that can be made by an operator seeking to determine the accuracy and precision of their foundry process.

Once the MZI structures are formed on a wafer, one may connect certain equipment to the MZIs structures and then employ the method described below to obtain the four (or more in other embodiments) photonic parameters. These parameters may then be compared to nominal values (design values) to determine the deviation from nominal. Having the described the overall arrangement and implementation of a system form obtaining photonic parameters, attention will now be directed to its details.

As one of ordinary skill will appreciate, an MZI is an interferometric structure that splits an incoming optical wave into two arms using a Y-splitter. The optical wave then travels along the two arms before being recombined by another Y-splitter. In an unbalanced MZI, the arms have different lengths. As a result, the optical waves may have a different relative phase when they are recombined. This can lead to destructive interference if the optical waves are out of phase. Conversely, if the optical waves are in phase this can lead to constructive interference.

FIG. 2 is a schematic illustration of a system 200 for measuring effective refractive indices. As mentioned above, the equipment in system 200 may be connected to one or more an MZI structures 208 formed on one or more wafers. Broadband interference spectra can then be obtained using white-light spectroscopy or tunable laser spectroscopy. First, a light source 202 is used to generate and emit light into an optical fiber 204. In a preferred embodiment, the light source 202 may be broadband blackbody light source such a Thorlabs SLS201L, and the optical fiber 204 may be a single-mode polarization-maintaining optical fiber such as Thorlabs PM980-XP. Another set of fibers 206A and 206B are then used to edge couple the light into and out of the MZI structure 208. In a preferred embodiment, fibers 206A and 206B are polarization-maintaining lensed fibers such as Oz Optics TPMJ. In one embodiment fiber 204 may be omitted and light from optical source is directed in light fiber 206A. Light output from the MZI structure 208 is passed through fiber 206B and focused onto a spectrometer 210. In a preferred embodiment, the spectrometer 210 may be Princeton Instruments SP2500. The output of the spectrometer 210 is then passed to a detector 212. In a preferred embodiment, the detector 212 maybe a liquid-nitrogen cooled InGaAs detector such as Princeton Instruments Plyon-IR. The light source 202, spectrometer 210, and detector 212 are communicably connected to a computer 214 that includes a processor, memory, and I/O architecture that allows the computer to control the operation of the light source 202, spectrometer 210, and detector 212. In addition, computer 214 receives data from detector 212, in particular the interference spectra respectively corresponding to the MZI structures 208. Computer 214 may then use the received data to determine the one or more photonic parameters. Having described the overall arrangement of system 200, attention will now be directed to MZI structure 208, with reference to FIGS. 3 and 4.

Figure 3:
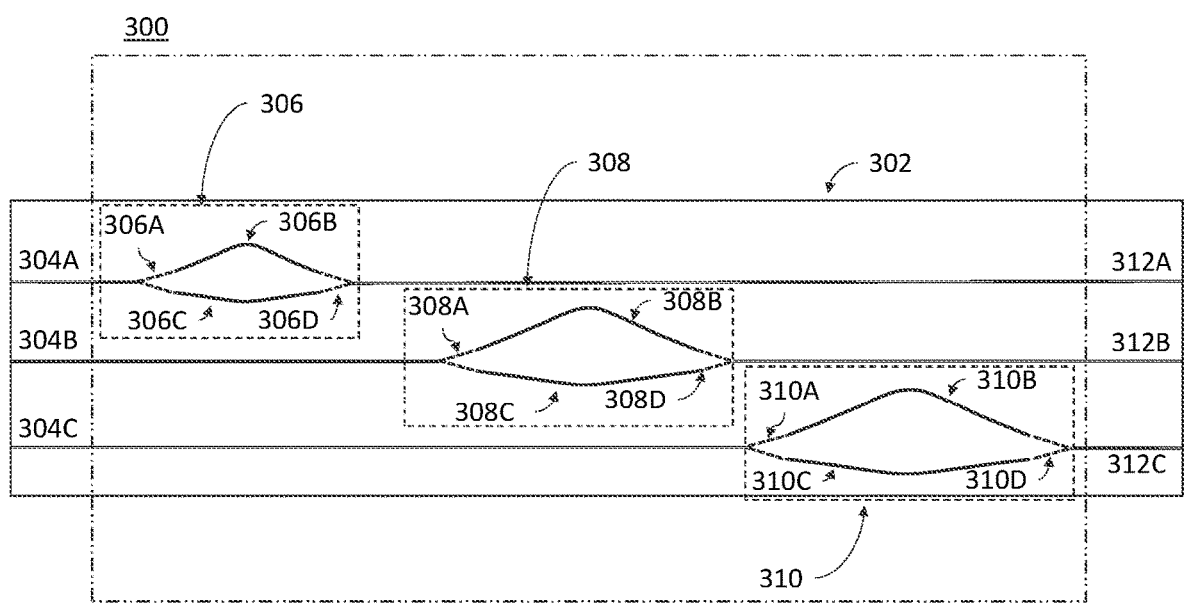
FIG. 3 is a schematic plan view of a set of MZIs according to one embodiment.

FIG. 3 is a plan view schematic illustration of a set of MZIs 300 formed on a wafer 302. The set of MZIs 300 includes three MZIs 306, 308, and 310. Also shown in FIG. 3, are a plurality of input waveguides 304A, 304B, 304C, and a plurality of output waveguides 312A, 312B, and 312C. Light from fiber 206A is edge coupled into the input waveguides 304A-C, and then passed through MZIs 306,

308, and 310. Light output from MZIs 306, 308, and 310 passes through output waveguides 312A, 312B, and 312C. The input waveguides 304A-C, MZIs 306, 308, and 310, and the output waveguides 312A-C may, in one embodiment, be formed of silicon nitride (SiN). A person of ordinary skill in the art will recognize that the specific dimensions and materials used to formed the input/output waveguides 304A-C and 312A-C and MZIs 306, 308, and 310 will depend upon the processes, equipment, and tolerances at a given foundry. One exemplary method of forming these structures is described here. A nominally 220 nm thick SiN waveguide/MZI layer is deposited on a 5 micron thick thermal oxide bottom cladding and then patterned using 193 nm immersion photolithography with 300 mm wafers. A 5 micron thick top oxide is then deposited on the fully-etched waveguides 304A-C and 312A-C and MZIs 306, 308, and 310 leaving them fully clad in $SiO_2$. The nominal, i.e. design, width (W design) of the waveguides 304A-C and 312A-C and the MZIs 306, 308, and 310 may be the same.

Returning to FIG. 3, the primary difference between MZIs 306, 308, and 310 is the order of the MZIs. As mentioned above, an MZI can be balanced or unbalanced. In a balanced MZI, the arms of the MZI are symmetric. In an unbalanced MZI, the lengths of the optical paths in the arms is different and the difference in path length ($\Delta L$) can be expressed by Equation 1 below:

$$\Delta L = \frac{m\lambda_c}{n_{eff}}$$

In Equation 1, m is the order of the MZI, $\lambda_c$ is the center wavelength of the targeted spectrum, and $n_{eff}$ is the effective index of the waveguide for the center wavelength and for the mode under investigation ($TE_{00}$ or $TM_{00}$). In FIG. 3, the orders of MZIs 306, 308, and 310 are different, or said another way the relative lengths of optical paths in each MZI are different. Taking MZI 306 as an example, MZI 306 includes a Y-splitter 306A that receives an optical wave from guide 304A and splits the optical wave into two arms 306B and 306C. As is self-evident from FIG. 3, the length of arm 306B is different from the length of arm 306C. The optical wave travelling through arms 306B and 306C is combined by a Y-splitter 306D and then propagates through waveguide 312A where it is edge coupled into fiber 206B. MZIs 308 and 310 have similar structures. MZI 308 includes a Y-splitter 308A that receives an optical wave from guide 304B and splits the optical wave into arms 308B and 308C which have different lengths. The optical waves travelling in arms 308B and 308C are recombined in Y-splitter 308D and then propagates through waveguide 312B where it is edge-coupled into fiber 206B. MZI 310 includes a Y-splitter 310A that receives an optical wave from guide 304C and splits the optical wave into arms 310B and 310C which have different lengths. The optical waves travelling in arms 310B and 310C are recombined in Y-splitter 310D and then propagates through waveguide 312C where it is edge-coupled into fiber 206B. It is self-evident from FIG. 3, the length of arm 310B is greater than that of 308B which in turn is greater than that of 306B. This means that orders of MZIs 306, 308, and 310 are different. By controlling the difference in path length $\Delta L$ within each of MZIs 306, 308, and 310 during fabrication, the order of the MZIs 306, 308, and 310 can be controlled—assuming the center wavelength/c of the targeted spectrum is also known. Furthermore, in a preferred embodiment, the MZIs are shallow-angle MZIs with a maximum bend angle of 22.5 degree as opposed to MZIs that use 90-degree bends. This reduces potential errors in measuring $n_{eff}$ and occupies less space.

Figure 4:
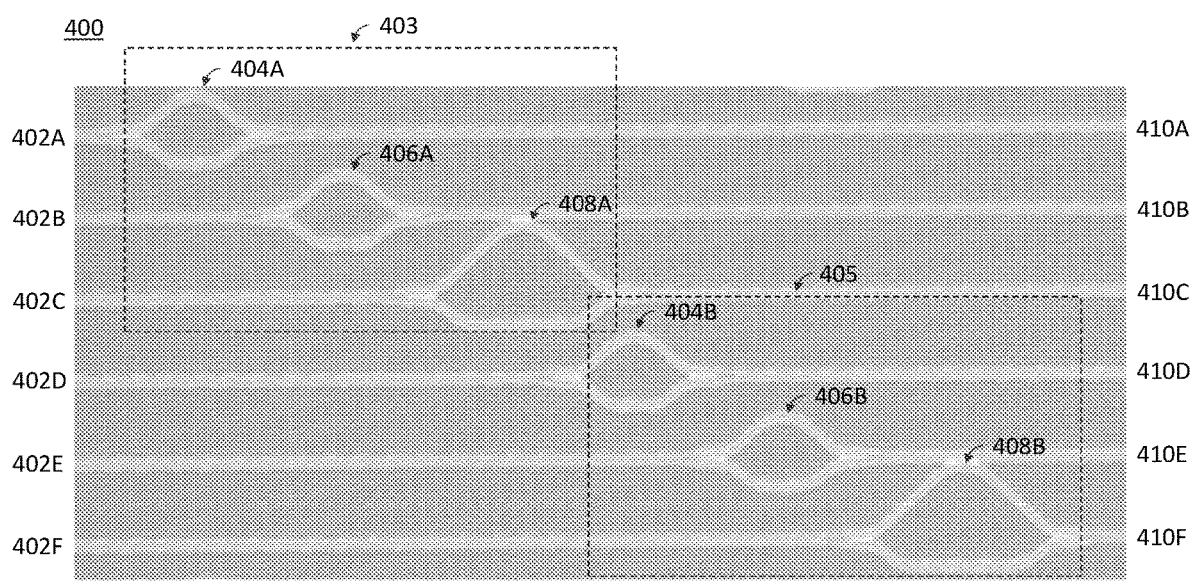
FIG. 4 is a plan view of a fabricated MZI structure according to one embodiment.

In a preferred embodiment, two sets of MZIs 300 (for a total of six MZIs) form an MZI structure. Each set of MZIs may have the same nominal width, $w_{design}$, but receive and transmit a different optical mode. FIG. 4 is illustrative.

FIG. 4 shows MZI structure 400 formed on a wafer that includes a first set of MZIs 403 that and a second set of MZIs 405. The first set of MZIs 403 includes MZIs 404A, 406A, and 408A. The second set of MZIs 405 includes MZIs 404B, 406B, and 408B. In a preferred embodiment, the first and second sets of MZIs 403 and 405 are substantially the same, and have the same construction and components as the set of MZIs 300 in FIG. 3. The first set of MZIs 403 may be used for one optical mode, e.g. a $TE_{00}$ mode. The second set of MZIs 405 may be used for another optical mode, e.g. a $TM_{00}$ mode. In one embodiment, the input fiber 206A may be edge coupled to guides 402A-C to create an optical path to the first set of MZIs (e.g., set 403), and then the source 202 may be controlled to emit the corresponding optical mode. Once the data is collected, the input fiber 206A can be edge coupled to guides 402D-F to create an optical path to the other set of MZIs (e.g., set 405) and the source 202 controlled to emit the other optical mode. In another embodiment, fiber 206A may be edge coupled to one particular waveguide to record the spectrum of a single MZI, and then, if necessary, fiber 206A may be edge coupled to another waveguide to record the spectrum of another single MZI. This process may be repeated until spectra from all MZIs for an MZI structure have been recorded. The design widths of waveguides 402A-F, MZIs in MZI sets 403 and 405, and waveguides 410A-F are the same in MZI structure 400. However, if other MZI structures are fabricated on the wafer, e.g. in another area, the waveguides and MZIs in those MZI structures could have different widths. The orders of the MZIs in those other MZI structures may also be different. MZI structure 400 may be used as element 208 in FIG. 2.

Having described the structure and components of system 200, attention will now be directed to explaining how two MZI structures 400 may be used to determine the four parameters identified above.

First, this method assumes that the waveguide core forming 304A-C, 306, 308, 310, and 312A-C is rectangular with the same cladding above and below. Another assumption is that the waveguide linewidth offset, that is a deviation from the actual width compared to the designed width, is independent of the width of the waveguide itself. This is an acceptable assumption when the widths of the waveguides are significantly larger than the minimum feature size and for offsets smaller than the minimum feature size.

To extract the four parameters at a given wavelength, four different effective index ($n_{eff}$) measurements are made using four recorded spectra ($S_i$):

(1) $S_1$ corresponding to the $TE_{00}$ mode propagating through an MZI in a first MZI structure with a width $w_1$;

(2) $S_2$ corresponding to the $TM_{00}$ mode propagating through an MZI in the first MZI structure with a width $w_1$;

(3) $S_3$ corresponding to the $TE_{00}$ mode propagating through an MZI in a second MZI structure with a width $w_2$; and (4) $S_4$ corresponding to the $TM_{00}$ mode propagating through an MZI in the second MZI structure with a width $w_2$.

This yields four values: $n_{eff}^{TE_w}{}_1(\lambda)$, $n_{eff}^{TM_w}{}_1(\lambda)$, $n_{eff}^{TE_w}{}_2(\lambda)$, $n_{eff}^{TM_w}{}_2(\lambda)$. It is possible to record these spectra using only two unbalanced MZIs, one of a width $w_1$ and one of a width $w_2$. Thus, in one embodiment, an MZI structure 208 may have only two MZIs of widths $w_1$ and $w_2$. To record $S_1$ and $S_2$, $TE_{00}$ and $TM_{00}$ optical modes are alternately propagated through the MZI of width $w_1$ and their spectra are recorded. To record $S_3$ and $S_4$, $TE_{00}$ and $TM_{00}$ optical modes are alternately passed through the MZI of width $w_2$ and their spectra are recorded. Using these recorded spectra, $n_{eff}$ may be calculated using the process described below for the highest order MZI.

However, in a preferred embodiment, more MZIs are used. In a preferred embodiment, for each optical mode and width, two relatively lower-order MZIs are used to coarsely identify $n_{eff}$ and then a relatively higher-order MZI is used to give a more precise measurement of $n_{eff}$. Thus, in a preferred embodiment, a first MZI structure 400A where the waveguides and MZI cores have a width $w_1$ is provided, and a second MZI structure 400B where the waveguides and MZI cores have a width $w_2$ is provided. MZI structures 400A and 400B are preferably formed on the wafer in close proximity to each other. Both the first and second MZI structures 400A and 400B, include two sets of three MZIs, two relatively lower-order MZIs and one higher-order MZI. In each MZI structure 400A and 400B, one set of MZIs is used for one optical mode and the other set of MZIs is used for the other optical mode. Having described the MZI structures, attention will now be directed to using those MZI structures in a preferred embodiment with reference to FIG. 5.

As discussed above, in S502, at least two MZI structures 400 with widths $w_1$ and $w_2$ are fabricated on a wafer. Each of these MZI structures may then be connected to system 200, in turn, so that transmission spectra through the MZI structures 400 are recorded using spectrometer 210 and detector 212. A method for recording transmission spectra is described in N. F. Tyndall "Mode-crossing spectroscopy for photonic waveguide characterization," APL Photonics 4(10), 106107 (2019) the contents of which are hereby incorporated by reference in their entirety. Fitting, in S506, the maxima and minima in the unbalanced MZI transmission spectrum combined with the interference formulae given by Equations 3 and 4 below for the maxima and minima, respectively, give the waveguide effective indices and dispersion for each mode and width (S508).

$$n_{eff}(\lambda) = \frac{m\lambda}{\Delta L} \qquad \text{Equation 3}$$

$$n_{eff}(\lambda) = \frac{(m+1/2)\lambda}{\Delta L} \qquad \text{Equation 4}$$

A second-order polynomial fit to $n_{eff}(\lambda)$ yields a best fit value for $n_{eff}$ as well as the fit error for any wavelength within the MZI bandwidth. Then, in S510, the measured effective indices can be used to solve for the four parameters.

To convert the measured effective index value to the four parameters of interests, computer 214 includes linear algebra programming and other software (e.g. Comsol Multiphysics—Electromagnetic Waves). For purposes of illustration and discussion, the mathematical discussion below corresponds to one preferred embodiment where two optical modes $TE_{00}$ and $TM_{00}$ are transmitted through two MZI structures one whose components have a width $w_1$ and the other whose components have a width $w_2$. But, as discussed above, this approach may be used to solve for any number of parameters. If fewer parameters are required, then the matrix formulation is only a 3×3 or a 2×2 and similarly a smaller number of waveguide types need to be interrogated. If more parameters are required, such as a bottom cladding refractive index separate from the top cladding refractive index, then the matrix dimension will grow as will the number of MZI types (a third width, for example).

A mode-solver may be used to calculate the effective indices $n_{eff(0)}^{TE_w}{}_1$, $n_{eff(0)}^{TM_w}{}_1$, $n_{eff(0)}^{TE_w}{}_2$, $n_{eff(0)}^{TM_w}{}_2$, for best-guess parameters $n_{core(0)}$, $n_{clad(0)}$, $t_{(0)}$, and $W_{ofst(0)}$. Then, assuming $|n_{eff} - n_{eff(0)}| \ll 1$ for each $n_{eff}$, $n_{eff}^{TE_w}{}_1$, $n_{eff}^{TM_w}{}_1$, $n_{eff}^{TE_w}{}_2$, $n_{eff}^{TM_w}{}_2$, may be given Equations 5-8 below:

$$n_{eff}^{TE_{w1}} = \qquad (5)$$
$$n_{eff(0)}^{TE_{w1}} + \frac{\partial n_{eff}^{TE_{w1}}}{\partial n_{core}}\Delta n_{core} + \frac{\partial n_{eff}^{TE_{w1}}}{\partial n_{clad}}\Delta n_{clad} + \frac{\partial n_{eff}^{TE_{w1}}}{\partial t}\Delta t + \frac{\partial n_{eff}^{TE_{w1}}}{\partial w}\Delta w$$

$$n_{eff}^{TM_{w1}} = \qquad (6)$$
$$n_{eff(0)}^{TM_{w1}} + \frac{\partial n_{eff}^{TM_{w1}}}{\partial n_{core}}\Delta n_{core} + \frac{\partial n_{eff}^{TM_{w1}}}{\partial n_{clad}}\Delta n_{clad} + \frac{\partial n_{eff}^{TM_{w1}}}{\partial t}\Delta t + \frac{\partial n_{eff}^{TM_{w1}}}{\partial w}\Delta w$$

$$n_{eff}^{TE_{w2}} = \qquad (7)$$
$$n_{eff(0)}^{TE_{w2}} + \frac{\partial n_{eff}^{TE_{w2}}}{\partial n_{core}}\Delta n_{core} + \frac{\partial n_{eff}^{TE_{w2}}}{\partial n_{clad}}\Delta n_{clad} + \frac{\partial n_{eff}^{TE_{w2}}}{\partial t}\Delta t + \frac{\partial n_{eff}^{TE_{w2}}}{\partial w}\Delta w$$

$$n_{eff}^{TM_{w2}} = \qquad (8)$$
$$n_{eff(0)}^{TM_{w2}} + \frac{\partial n_{eff}^{TM_{w2}}}{\partial n_{core}}\Delta n_{core} + \frac{\partial n_{eff}^{TM_{w2}}}{\partial n_{clad}}\Delta n_{clad} + \frac{\partial n_{eff}^{TM_{w2}}}{\partial t}\Delta t + \frac{\partial n_{eff}^{TM_{w2}}}{\partial w}\Delta w$$

In Equations 5-8 above, the effective indices on the right-hand sides $n_{eff(0)}^{TE_w}{}_1$, $n_{eff(0)}^{TM_w}{}_1$, $n_{eff(0)}^{TE_w}{}_2$, $n_{eff(0)}^{TM_w}{}_2$, and the partial derivatives are found by computer 214 using a mode solver program stored in memory thereon or on another device communicably connected to computer 214, and the delta-parameters ($\Delta n_{core}$, $\Delta n_{clad}$, $\Delta t$, and $\Delta w$) are the quantities to be solved for. This approach assumes that each calculated effective index is linearly dependent on each of the four parameters, and that these dependencies are mutually independent. For initial parameter guesses that satisfy $|n_{eff} - n_{eff(0)}| \ll 1$, this assumption is valid (typically within a few percent), but otherwise, an iterative approach that uses a second set of initial guesses given by $n_{core(0)} + \Delta n_{core}$, $n_{clad(0)} + \Delta n_{clad}$, $t_{(0)} + \Delta t$, and $W_{ofst(0)} + \Delta W_{ofst}$ can be used. To solve for the set of parameters $\Delta n_{core}$, $\Delta n_{clad}$, $\Delta t$, and $\Delta w$, Equations 5-8 can be rewritten into Equation 9 below:

$$\begin{pmatrix} n_{eff}^{TE_{w1}} - n_{eff(0)}^{TE_{w1}} \\ n_{eff}^{TM_{w1}} - n_{eff(0)}^{TM_{w1}} \\ n_{eff}^{TE_{w2}} - n_{eff(0)}^{TE_{w2}} \\ n_{eff}^{TM_{w2}} - n_{eff(0)}^{TM_{w2}} \end{pmatrix} = \begin{pmatrix} \frac{\partial n_{eff}^{TE_{w1}}}{\partial n_{core}} & \frac{\partial n_{eff}^{TE_{w1}}}{\partial n_{clad}} & \frac{\partial n_{eff}^{TE_{w1}}}{\partial t} & \frac{\partial n_{eff}^{TE_{w1}}}{\partial w} \\ \frac{\partial n_{eff}^{TM_{w1}}}{\partial n_{core}} & \frac{\partial n_{eff}^{TM_{w1}}}{\partial n_{clad}} & \frac{\partial n_{eff}^{TM_{w1}}}{\partial t} & \frac{\partial n_{eff}^{TM_{w1}}}{\partial w} \\ \frac{\partial n_{eff}^{TE_{w2}}}{\partial n_{core}} & \frac{\partial n_{eff}^{TE_{w2}}}{\partial n_{clad}} & \frac{\partial n_{eff}^{TE_{w2}}}{\partial t} & \frac{\partial n_{eff}^{TE_{w2}}}{\partial w} \\ \frac{\partial n_{eff}^{TM_{w2}}}{\partial n_{core}} & \frac{\partial n_{eff}^{TM_{w2}}}{\partial n_{clad}} & \frac{\partial n_{eff}^{TM_{w2}}}{\partial t} & \frac{\partial n_{eff}^{TM_{w2}}}{\partial w} \end{pmatrix} \begin{pmatrix} \Delta n_{core} \\ \Delta n_{clad} \\ \Delta t \\ \Delta w \end{pmatrix}$$

Linear matrix techniques are then used to solve for the parameter offsets so that:

$$\begin{pmatrix} n_{core} = n_{core(0)} + \Delta n_{core} \\ n_{clad} = n_{clad(0)} + \Delta n_{clad} \\ t = t_{(0)} + \Delta t \\ w_{ofst} = w_{ofst(0)} + \Delta w \end{pmatrix}$$

Fit errors in the measured $n_{eff}(\lambda)$ values are propagated through this solution to give errors in the final parameter set. Having described the mathematical background, attention will now be directed to a physical implementation of this mathematical background to solve for the four parameters in one exemplary embodiment.

Figure 6:
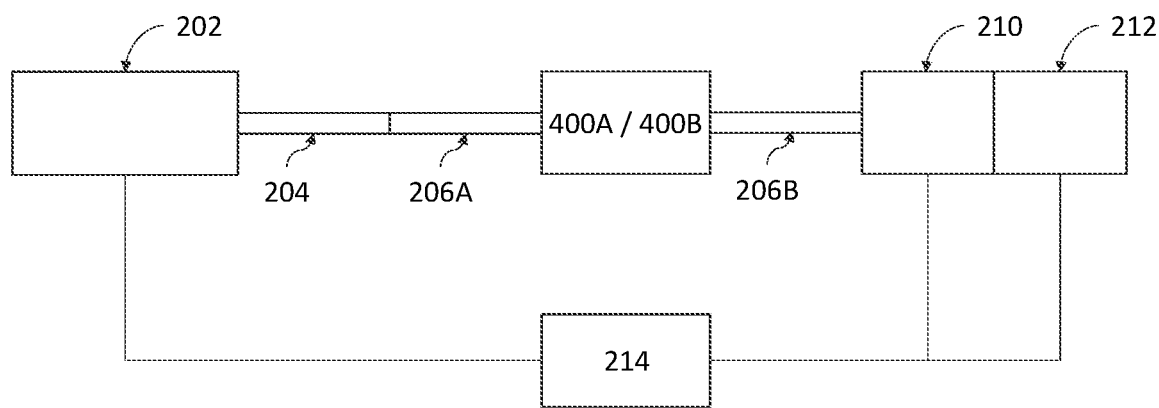
FIG. 6 is a schematic illustration of a system for obtaining photonic parameters according to another embodiment.

As discussed above, to solve for the four parameters in a preferred embodiment, two MZI structures 400A and 400B with widths $w_1$ and $w_2$, respectively, are used. FIG. 6 is illustrative. Of course, system 200 is connected to only one of MZI structures 400A and 400B at a time so that a corresponding recording spectra may be recorded. In the exemplary embodiment described here, the only difference between MZI structures 400A and 400B are the widths of the waveguides and MZIs contained therein. Thus, for simplicity and brevity the operation of MZI structures 400A and 400B will be described in regard to MZI structure 400 illustrated in FIG. 4. As shown in FIG. 4, a first set of MZIs 403 and a second set of MZIs 405 are provided. The first set of MZIs 403 includes MZIs 404A, 406A, and 408A. The first set of MZIs 403 are constructed to carry one optical mode (e.g., the $TE_{00}$ mode). The second set of MZIs includes MZIs 404B, 406B, and 408B. The second set of MZIs 405 is constructed to carry another optical mode (e.g., the $TM_{00}$ mode).

One set of MZIs (including three MZIs) are used for each width and mode with ΔL for each MZI varying based on MZI order, each targeting constructive interference at either 1064 nm (w=0.8 microns), 1310 (w=1.2 microns), or 1550 nm (w=1.5 microns). The orders for the two lowest-order MZIs in the first and second set of MZIs 403 and 405 are given by Table 1 below:

| Target Wavelength | 404A | 404B | 406A | 406B |
|---|---|---|---|---|
| 1064 nm | 7 | 7 | 8 | 8 |
| 1310 nm | 7 | 7 | 8 | 8 |
| 1550 nm | 8 | 8 | 9 | 9 |

These values are chosen, in the exemplary embodiment, to ensure a single unambiguous peak at the target wavelength based on an uncertainty in the material indices and geometry. The ΔZ of the highest order MZI in MZI sets 403 and 404, namely MZIs 408A and 408B, is exactly 4 times larger than that of the lowest order MZI to provide more measurement precision of $n_{eff}$. In this exemplary embodiment, the design of the Y-splitters within each MZI is the same for both the $TE_{00}$ and $TM_{00}$ modes but may be optimized for a specific wavelength band. More specifically, in one embodiment ΔL is chosen so that a constructive interference peak is near the center of the wavelength band, based on $n_{eff}$ and the mode order (m) for the mode.

Returning to FIG. 5, in S504 interference spectra are recorded. As discussed above, the minimum number of recorded spectra to obtain the four parameters is four and could be obtained with as little as two MZIs of widths $w_1$ and $w_2$. However, in this exemplary ("EX") embodiment, the following spectra ($S_1$-ex) are recorded:

(1) $S_{1-EX}$ corresponding to the $TE_{00}$ mode propagating through the first set of MZIs 403 in the first MZI structure 400A, with a width $w_1$;

(2) $S_{2-EX}$ corresponding to the $TM_{00}$ mode propagating through the second set of MZIs 405 in the first MZI structure 400A with a width $w_1$;

(3) $S_{3-EX}$ corresponding to the $TE_{00}$ mode propagating through the first set of MZIs 403 in the second MZI structure 400B, with a width $w_2$; and (4) $S_{4-EX}$ corresponding to the $TM_{00}$ mode propagating through the second set of MZIs 405 in the second MZI structure 400B, with a width $w_2$.

Figure 7:
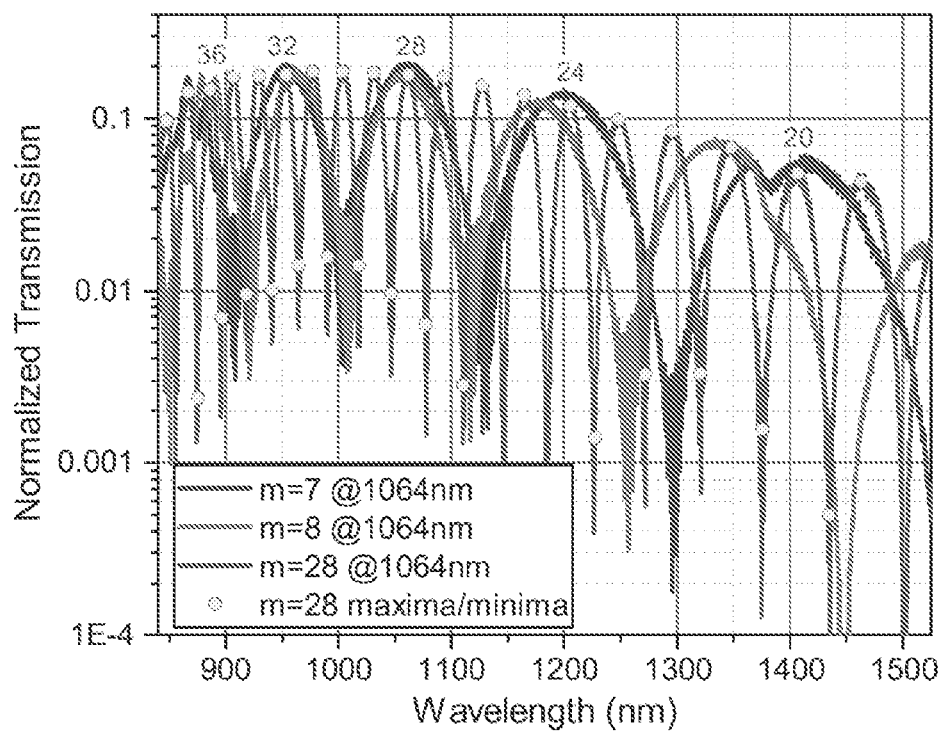
FIG. 7 is a plot of normalized transmission versus wavelength.
Figure 8:
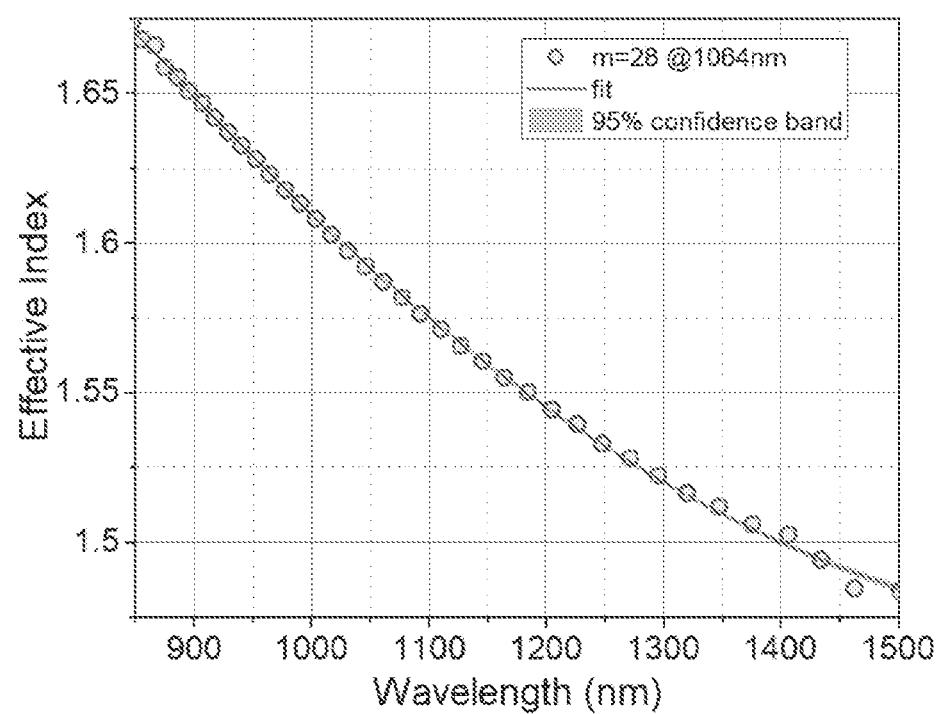
FIG. 8 is a plot effective index versus wavelength generated based on the data in FIG. 7.

In this exemplary embodiment, each record spectra will include three transmission plots respectively corresponding to the three MZIs in the MZI set. FIG. 7 is illustrative. FIG. 7 is a plot of spectra $S_{1-EX}$ showing normalized transmission versus wavelength for the $TE_{00}$ optical mode propagating through a first set of MZIs 403 (of orders 7, 8, and 28 respectively at 1064 nm) in the first MZI structure 400A having a width of 0.8 microns. It is self-evident from FIG. 7 that there are a greater number of maxima and minima in the plot corresponding to the higher order MZI (order 28), which is MZI 408A in FIG. 4. Because there are a greater number of maxima and minima, it is possible to obtain a higher level of accuracy and precision by using those maxima and minima to determine $n_{eff}$. Thus, the two lower order spectra are used to coarsely identify $n_{eff}$ at the design wavelength, and the highest order spectrum is used to precisely measure $n_{eff}$ using an algorithm to identify interference maxima and minima (S506), such as the one described in Sarvagya Dwivedi, "Experimental Extraction of Effective Refractive Index and Thermo-Optic Coefficients on Silicon-on-Insulator Waveguides Using Interferometers" J. of Lightwave Tech., v. 33, no. 21, 4471 Nov. 1, 2015, the contents of which are incorporated by reference herein in their entirety. The effective index is then fit with a second-order polynomial giving a best-fit effective index and error at each wavelength, as shown in FIG. 8 which is a plot of effective index versus wavelength corresponding to MZI 408A in FIG. 7 with an order of 28. With this data, computer 214 can then calculate the effective index and its partial derivative using Comsol Multiphysics (Electromagnetic Waves). Spectra $S_{2-EX}$, $S_{3-EX}$, and $S_{4-EX}$ are then recorded and computer 214, again using Comsol Multiphysics (Electromagnetic Waves), determines the effective indices and partial derivatives based on that data (S508). With the effective indices and partial derivatives in hand, computer 214 can then use the equations shown above to determine the four parameters. Table 2 below shows the results of the above process for certain initial guesses, width $w_1$ and $w_2$, and input wavelengths.

TABLE 2

|  | Initial Guess | Extracted | |
|---|---|---|---|
| design widths $w_1$, $w_2$ (microns) | — | 0.80, 1.20 | |
| Wavelength (nm) | — | 1250 | 1300 |
| $n_{core}$ | 1.985 | 1.960 ± 0.006 | 1.947 ± 0.009 |
| $n_{clad}$ | 1.450 | 1.440 ± 0.002 | 1.439 ± 0.002 |
| t (nm) | 220 | 218 ± 4 | 224 ± 6 |
| $w_{ofst}$ (nm) | 0 | −12 ± 6 | −4 ± 7 |

Table 2 shows that the initial guess (which may simply be the nominal design value) for the refractive indices of the core and the cladding may be significantly different from that in fabricated wafer. If the design of the PICs formed on the wafer demanded that the refractive indices of the core and cladding stay within one percent of their design value, then the foundry's fabrication process may not be acceptable. In the example above, the widths $w_1$ and $w_2$ were 0.8 microns and 1.2 microns, respectively. However, other widths could also be used. In fact, it may be beneficial to form three MZI structures 400 each with a different width and then compare the extracted values of the four parameters using different pairs of MZI structures. In that regard, let us consider the exemplary embodiment when a third MZI structure is formed in close proximity to MZI structures 400A and 400B, with a third width $w_3$ which may, in this example, be 1.5 microns. With three structures, there are three unique pair combinations. Table 1 above shows the first unique pair combination for MZI structure 400A and 400B. Tables 3 and 4 below show the extracted values for the other pair combinations.

TABLE 3

|  | Initial Guess | Extracted | |
| --- | --- | --- | --- |
| design widths $w_1$, $w_3$ (microns) | — | 0.80, 1.50 | |
| Wavelength (nm) | — | 1250 | 1300 |
| $n_{core}$ | 1.985 | 1.951 ± 0.005 | 1.959 ± 0.005 |
| $n_{clad}$ | 1.450 | 1.438 ± 0.002 | 1.441 ± 0.002 |
| t (nm) | 220 | 224 ± 4 | 218 ± 3 |
| $w_{ofst}$ (nm) | 0 | −5 ± 6 | −17 ± 5 |

TABLE 3

|  | Initial Guess | Extracted | |
| --- | --- | --- | --- |
| design widths $w_1$, $w_3$ (microns) | — | 1.20, 1.50 | |
| Wavelength (nm) | — | 1250 | 1300 |
| $n_{core}$ | 1.985 | 1.937 ± 0.019 | 1.986 ± 0.018 |
| $n_{clad}$ | 1.450 | 1.433 ± 0.007 | 1.450 ± 0.007 |
| t (nm) | 220 | 235 ± 13 | 198 ± 13 |
| $w_{ofst}$ (nm) | 0 | −1 ± 26 | −55 ± 23 |

Figure 9:
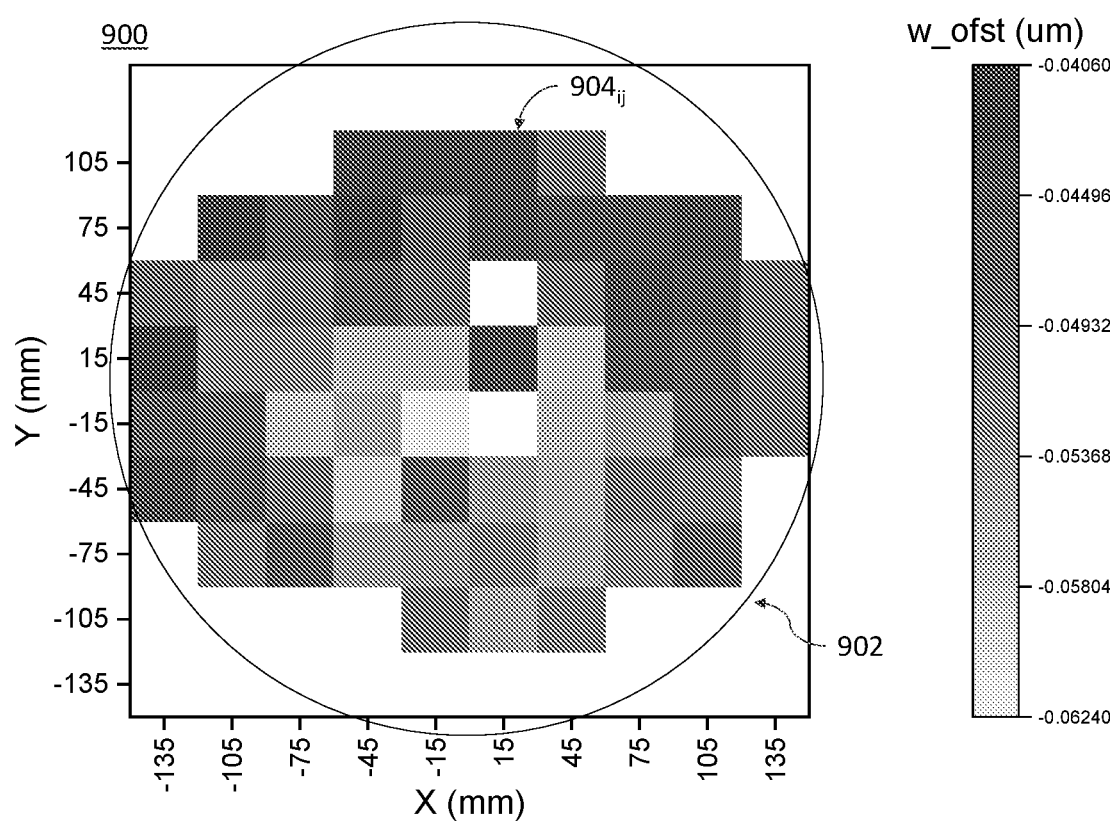
FIG. 9 is a map of width offset values calculated at a plurality of locations on wafer.

Having described exemplary systems and method for determining one or more photonic parameters, attention will now be directed to using such systems and methods to evaluate the operation of a photonic foundry. As discussed above, PICs are formed on a wafer according to a foundry's process. While that process is generally accurate, deviations from a nominal design are possible not only across wafers but different areas of a single wafer. It is therefore desirable to track variations in one or more photonic parameters (like the parameters described above) across a single wafer. One exemplary process for doing this is to form one or more MZI structures in each wafer field. As one of ordinary skill will appreciate, a wafer is typically divided into a plurality of fields, where each field is subjected to a photolithography process to form one or more PICs in that area. Each field may include additional area to allow for the formation of MZI structures 400 for evaluation of the foundry's process. With MZI structures 400 formed in some or all of the fields of the wafer, one or more of the above processes may be used to determine one or more photonic parameters corresponding to those fields. The one or more photonic parameters may then be mapped to the fields themselves to generate an image showing their respective variations across the wafer. FIG. 9 is illustrative. FIG. 9 is a map 900 of width offset ($w_{ofst}$), that is the difference between a nominal, design, width and the actual width of a waveguide, across a plurality of fields of a single wafer 902. In the case of FIG. 9, the wafer is 300 mm wide and contains 64 fields $904_{ij}$, each of which is 30×30 mm. As one of ordinary skill will appreciate, each of the fields may be designated by a number i corresponding to a row and a number j corresponding to a column. While FIG. 9 shows a map of width offset $w_{ofst}$ over a plurality of fields $904_{ij}$, the other photonic parameters discussed above (refractive index of the core material, refractive index of the cladding material, and thickness) could also be mapped in the same manner. In addition, if one adds additional MZI structures with different widths, then the matrix operations discussed above may be expanded to determine further photonic parameters which themselves may also be mapped to a wafer. By generating maps like map 900 across multiple wafers, systematic errors and random (statistical) variations in a foundry process may be identified.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for obtaining photonic parameters, comprising:
    a computer that includes a processor and memory;
    an optical source constructed to emit light of a first optical mode and a second optical mode in response to an instruction by the computer;
    a first optical fiber configured to receive the first optical mode or the second optical mode from the optical source;
    a first Mach-Zehnder Interferometer structure comprising a first plurality of Mach-Zehnder Interferometers and a second plurality of Mach-Zehnder Interferometers, wherein the first Mach-Zehnder Interferometer structure is configured to receive the first optical mode or the second optical mode from the first optical fiber;
    a second Mach-Zehnder Interferometer structure comprising a third plurality of Mach-Zehnder Interferometers and a fourth plurality of Mach-Zehnder Interferometers, wherein the second Mach-Zehnder Interferometer structure is configured to receive the first optical mode or the second optical mode from the first optical fiber;

a second optical fiber configured to receive light from the first Mach-Zehnder Interferometer structure and the second Mach-Zehnder Interferometer structure; and a detector configured to receive light that propagated through the second optical fiber, generate image data, and provide the image data to the computer, wherein the computer is configured to obtain a plurality of photonic parameters based on the image data and initial guesses for the plurality of photonic parameters.

2. The system of claim 1, wherein the first plurality of Mach-Zehnder Interferometers, the second plurality of Mach-Zehnder Interferometers, the third plurality of Mach-Zehnder Interferometers, and the fourth plurality of Mach-Zehnder Interferometers are shallow-angle Mach-Zehnder Interferometers.

3. The system of claim 1, wherein each of the first plurality of Mach-Zehnder Interferometers, the second plurality of Mach-Zehnder Interferometers, the third plurality of Mach-Zehnder Interferometers, and the fourth plurality of Mach-Zehnder Interferometers comprise two arms of different lengths.

4. The system of claim 1, wherein the first plurality of Mach-Zehnder Interferometers and the third plurality of Mach-Zehnder Interferometers are constructed to receive the first optical mode.

5. The system of claim 4, wherein the second plurality of Mach-Zehnder Interferometers and the fourth plurality of Mach-Zehnder Interferometers are constructed to receive the second optical mode.

6. The system of claim 1, wherein a width of a waveguide in the first plurality of Mach-Zehnder Interferometers and the second plurality of Mach-Zehnder Interferometers is different from a width of a waveguide in the third plurality of Mach-Zehnder Interferometers and the fourth plurality of Mach-Zehnder Interferometers.

7. The system of claim 1, wherein the image data generated by the detector includes:

a first recorded spectra corresponding to the first optical mode passing through the first plurality of Mach-Zehnder Interferometers, a second recorded spectra corresponding to the second optical mode passing through the second plurality of Mach-Zehnder Interferometers, a third recorded spectra corresponding to the first optical mode passing through the third plurality of Mach-Zehnder Interferometers, and a fourth recorded spectra corresponding to the second optical mode passing through the fourth plurality of Mach-Zehnder Interferometers.

* * * * *